(12) United States Patent
Zhao et al.

(10) Patent No.: US 10,480,835 B2
(45) Date of Patent: Nov. 19, 2019

(54) GAS-REPLENISHING AND ENTHALPY-INCREASING CONTROL METHOD, DEVICE AND APPARATUS FOR TWO-STAGE COMPRESSOR

(71) Applicant: GREE ELECTRIC APPLIANCES, INC. OF ZHUHAI, Zhuhai, Guangdong (CN)

(72) Inventors: Huan Zhao, Guangdong (CN); Jun Shen, Guangdong (CN); Feng Tan, Guangdong (CN); Youxuan Liang, Guangdong (CN); Pengfei Li, Guangdong (CN)

(73) Assignee: GREE ELECTRIC APPLIANCES, INC. OF ZHUHAI, Zhuhai, Guangdong (CN)

( * ) Notice: Subject to any disclaimer, the term of this patent is extended or adjusted under 35 U.S.C. 154(b) by 0 days.

(21) Appl. No.: 15/775,476

(22) PCT Filed: May 5, 2016

(86) PCT No.: PCT/CN2016/081171
§ 371 (c)(1),
(2) Date: May 11, 2018

(87) PCT Pub. No.: WO2017/096752
PCT Pub. Date: Jun. 15, 2017

(65) Prior Publication Data
US 2018/0356136 A1    Dec. 13, 2018

(30) Foreign Application Priority Data
Dec. 11, 2015  (CN) .......................... 2015 1 0926140

(51) Int. Cl.
| | | |
|---|---|---|
| F25B 41/00 | (2006.01) | |
| F25B 41/06 | (2006.01) | |
| F25B 13/00 | (2006.01) | |

(52) U.S. Cl.
CPC ............ *F25B 41/062* (2013.01); *F25B 13/00* (2013.01); *F25B 2341/0661* (2013.01);
(Continued)

(58) Field of Classification Search
CPC ........ F25B 41/062; F25B 13/00; F25B 49/02; F25B 2341/0661; F25B 2400/074;
(Continued)

(56) References Cited

U.S. PATENT DOCUMENTS

| | | | | |
|---|---|---|---|---|
| 6,018,959 A | * | 2/2000 | Schmidt ................ | F25B 41/062 62/211 |
| 6,711,911 B1 | * | 3/2004 | Grabon ................. | F25B 41/062 62/175 |

(Continued)

FOREIGN PATENT DOCUMENTS

| | | |
|---|---|---|
| CN | 102538273 A | 7/2012 |
| CN | 102679609 A | 9/2012 |

(Continued)

OTHER PUBLICATIONS

WIPO, International Search Report dated Sep. 21, 2016.
China Patent Office, Search Report dated May 9, 2017.
European Patent Office, Search Report dated Jul. 2, 2019.

*Primary Examiner* — Travis C Ruby
(74) *Attorney, Agent, or Firm* — Li & Cai Intellectual Property (USA) Office (57) ABSTRACT

Provided are a gas-replenishing and enthalpy-increasing control method, device and apparatus for a two-stage compressor. The method includes: when a gas-replenishing electronic expansion valve needs to be opened, gradually increasing, by a controller, an opening degree of the gas-
(Continued)

replenishing electronic expansion valve in a time sequence; after the gas-replenishing electronic expansion valve is opened, acquiring a detected gas-replenishing superheat degree of a two-stage compressor; and adjusting, based on the gas-replenishing superheat degree of the two-stage compressor, the opening degree of the gas-replenishing electronic expansion valve, wherein the gas-replenishing electronic expansion valve is disposed between a medium-pressure liquid storage tank and the two-stage compressor, and when the opening degree of the gas-replenishing electronic expansion valve is not zero, a gaseous refrigerant in the medium-pressure liquid storage tank replenishes gas and increases enthalpy for the two-stage compressor.

9 Claims, 4 Drawing Sheets

(52) U.S. Cl.
CPC ..... *F25B 2400/074* (2013.01); *F25B 2500/19* (2013.01); *F25B 2500/28* (2013.01); *F25B 2600/01* (2013.01); *F25B 2600/2513* (2013.01); *F25B 2700/1933* (2013.01); *F25B 2700/21151* (2013.01); *F25B 2700/21152* (2013.01)

(58) Field of Classification Search
CPC .............. F25B 2500/19; F25B 2500/28; F25B 2600/01; F25B 2600/2513; F25B 2700/1933; F25B 2700/21151; F25B 2700/21152
See application file for complete search history.

(56) References Cited

U.S. PATENT DOCUMENTS

| | | | | |
|---|---|---|---|---|
| 9,803,894 | B2 * | 10/2017 | Lin | F25B 13/00 |
| 2006/0032245 | A1 * | 2/2006 | Kates | F24F 3/1603 |
| | | | | 62/129 |
| 2006/0266074 | A1 * | 11/2006 | Groll | F25B 1/10 |
| | | | | 62/510 |
| 2007/0151266 | A1 * | 7/2007 | Yakumaru | F25B 1/10 |
| | | | | 62/197 |
| 2007/0193290 | A1 * | 8/2007 | Ebara | B60H 1/00885 |
| | | | | 62/238.6 |
| 2008/0022706 | A1 * | 1/2008 | Sakimichi | F25B 1/10 |
| | | | | 62/190 |
| 2009/0158764 | A1 * | 6/2009 | Kim | F25B 13/00 |
| | | | | 62/225 |
| 2009/0165481 | A1 * | 7/2009 | Ko | F25B 49/005 |
| | | | | 62/195 |
| 2009/0165482 | A1 * | 7/2009 | Ko | F25B 1/10 |
| | | | | 62/222 |
| 2010/0131115 | A1 * | 5/2010 | Kim | F25B 1/10 |
| | | | | 700/282 |
| 2011/0023514 | A1 * | 2/2011 | Mitra | F25B 1/10 |
| | | | | 62/222 |
| 2011/0174014 | A1 * | 7/2011 | Scarcella | F25B 1/10 |
| | | | | 62/510 |
| 2012/0000228 | A1 * | 1/2012 | Kinoshita | F25B 13/00 |
| | | | | 62/222 |
| 2012/0011866 | A1 * | 1/2012 | Scarcella | F25B 1/10 |
| | | | | 62/79 |
| 2012/0247138 | A1 * | 10/2012 | Senf, Jr. | F25B 49/02 |
| | | | | 62/191 |
| 2013/0098085 | A1 * | 4/2013 | Judge | H05K 7/20827 |
| | | | | 62/180 |
| 2013/0205815 | A1 * | 8/2013 | Izadi-Zamanabadi | F25B 41/062 |
| | | | | 62/115 |
| 2013/0340452 | A1 * | 12/2013 | Kleman | F25B 41/043 |
| | | | | 62/115 |
| 2014/0150489 | A1 * | 6/2014 | Gan | F25D 17/06 |
| | | | | 62/428 |
| 2014/0151015 | A1 * | 6/2014 | Sun | F25B 1/10 |
| | | | | 165/253 |
| 2014/0360218 | A1 * | 12/2014 | Takenaka | F25B 13/00 |
| | | | | 62/324.6 |
| 2015/0168037 | A1 * | 6/2015 | Ariyama | F25B 1/10 |
| | | | | 62/190 |
| 2015/0192336 | A1 * | 7/2015 | Ceccarelli | F25B 49/02 |
| | | | | 62/115 |
| 2015/0233623 | A1 * | 8/2015 | Izadi-Zamanabadi | F25B 1/00 |
| | | | | 62/115 |
| 2015/0323234 | A1 * | 11/2015 | Izadi-Zamanabadi | F25B 41/062 |
| | | | | 62/225 |
| 2018/0283755 | A1 * | 10/2018 | Zhao | F25B 49/022 |
| 2018/0363954 | A1 * | 12/2018 | Zhao | F24F 11/89 |

FOREIGN PATENT DOCUMENTS

| | | |
|---|---|---|
| CN | 202709311 U | 1/2013 |
| CN | 103807917 A | 5/2014 |
| CN | 103822418 A | 5/2014 |
| CN | 103925753 A | 7/2014 |
| CN | 104197474 A | 12/2014 |
| CN | 104913558 A | 9/2015 |
| CN | 105371548 A | 3/2016 |
| CN | 205262011 U | 5/2016 |
| EP | 0837291 A2 | 4/1998 |
| EP | 2224187 A3 | 5/2012 |
| JP | 3164626 B2 | 5/2001 |
| JP | 2007178042 A | 7/2007 |
| WO | WO 2013031591 A1 | 3/2013 |

* cited by examiner

GAS-REPLENISHING AND ENTHALPY-INCREASING CONTROL METHOD, DEVICE AND APPARATUS FOR TWO-STAGE COMPRESSOR

TECHNICAL FIELD

The present disclosure relates to the field of air-conditioning control, and more particularly to a gas-replenishing and enthalpy-increasing control method, device and apparatus for a two-stage compressor.

BACKGROUND

As an ambient temperature is lower, the demand for air-conditioning heating capacity is increasing. A current single-stage compression heat pump can only be started normally at minus 20 degrees, and the air-conditioning heating capacity is severely degraded in a low-temperature environment, the heating effect cannot be ensured, and the reliability of an air-conditioning unit has also been severely tested.

Compared with a single-stage compression heat pump, a two-stage compression system with enhanced vapor injection has a larger heating capacity at a lower temperature and higher energy efficiency; and the two-stage compression system can reduce the pressure ratio of a single-stage compressor and reduce the exhaust temperature. Meanwhile, the suction efficiency and the compression efficiency may be increased, thereby increasing the heating capacity and the heating efficiency.

The two-stage compression system with enhanced vapor injection has two or more cylinders which are divided into a high-pressure stage and a low-pressure stage, wherein a low-pressure cylinder is used for a first-stage compressor, and a high-pressure cylinder is used for a second-stage compressor. The principle of enhanced vapor injection is to inject a gaseous refrigerant into a suction port of the high-pressure cylinder of the compressor from an enhanced vapor injection port in the middle of the compressor. The injected gaseous refrigerant will be mixed with a refrigerant discharged after being compressed by the low-pressure cylinder and then enter the high-pressure cylinder for compression.

At present, a two-way valve is used to control the enhanced vapor injection of a compressor. The two-way valve only has a switching function. When the compressor is running at a high speed, if the two-way valve is suddenly opened, a refrigerant will enter the compressor from an enhanced vapor injection port in the middle of the compressor and is mixed with low-pressure exhaust gas, the suction volume of a high-pressure cylinder is increased suddenly, and the exhaust of a low-pressure cylinder is also affected by injection resistance, thereby resulting in a sudden increase in a compressor load, and resulting in a great reduction in reliability of the compressor. The operating life of components in the compressor will be affected. On the other hand, the two-way valve cannot accurately control the replenishment amount of gas during the intermediate enthalpy increase because it only has the switching function. Therefore, it is difficult to ensure the continuous and efficient operation of the two-stage compression system.

SUMMARY

According to a first aspect of the embodiment of the present disclosure, a gas-replenishing and enthalpy-increasing control method for a two-stage compressor is provided.

The gas-replenishing and enthalpy-increasing control method includes: when a gas-replenishing electronic expansion valve needs to be opened, a controller gradually increases an opening degree of the gas-replenishing electronic expansion valve in a time sequence; after the gas-replenishing electronic expansion valve is opened, a detected gas-replenishing superheat degree of a two-stage compressor is acquired; and based on the gas-replenishing superheat degree of the two-stage compressor, the opening degree of the gas-replenishing electronic expansion valve is adjusted, wherein the gas-replenishing electronic expansion valve is disposed between a medium-pressure liquid storage tank and the two-stage compressor, and when the opening degree of the gas-replenishing electronic expansion valve is not zero, a gaseous refrigerant in the medium-pressure liquid storage tank replenishes gas and increases enthalpy for the two-stage compressor.

In some embodiments, the operation that a controller gradually increases, when a gas-replenishing electronic expansion valve needs to be opened, the opening degree of the gas-replenishing electronic expansion valve in a time sequence includes: after the two-stage compressor is opened and operates for a first preset time period, the controller controls the opening degree of the gas-replenishing electronic expansion valve to be a first preset opening degree; when the opening degree of the gas-replenishing electronic expansion valve is the first preset opening degree, after the gas-replenishing expansion valve operates for a second preset time period, the opening degree of the gas-replenishing electronic expansion valve is increased by a second preset opening degree; and when the opening degree of the gas-replenishing electronic expansion valve is a second preset opening degree, after the gas-replenishing expansion valve operates for a third preset time period, the gas-replenishing electronic expansion valve is fully opened.

In some embodiments, the operation that the gas-replenishing superheat degree of a detected two-stage compressor is acquired includes: a gas-replenishing temperature and a gas-replenishing pressure of the two-stage compressor are collected; a saturation temperature corresponding to the gas-replenishing pressure is acquired; and a difference between the gas-replenishing temperature and the saturation temperature is taken as the gas-replenishing superheat degree of the two-stage compressor.

In some embodiments, the operation that the opening degree of the gas-replenishing electronic expansion valve is adjusted based on the gas-replenishing superheat degree of the two-stage compressor includes: it is judged whether the gas-replenishing superheat degree of the two-stage compressor is greater than a preset superheat degree at predetermined intervals; if the gas-replenishing superheat degree of the two-stage compressor is greater than the preset superheat degree, it is determined that the replenished gas of the two-stage compressor entrains liquid; if the gas-replenishing superheat degree of the two-stage compressor is not greater than the preset superheat degree, it is determined that the replenished gas of the two-stage compressor does not entrain liquid; and the opening degree of the gas-replenishing electronic expansion valve is adjusted according to the situation that the replenished gas of the two-stage compressor entrains liquid.

In some embodiments, the operation that the opening degree of the gas-replenishing electronic expansion valve is adjusted according to the situation that the replenished gas of the two-stage compressor entrains liquid includes: if the replenished gas of the two-stage compressor entrains liquid, the current opening degree of the gas-replenishing electronic expansion valve is reduced by a preset opening degree, wherein the preset opening degree is an opening degree preset based on a full opening degree of the gas-replenishing electronic expansion valve, and the full opening degree is an opening degree when the gas-replenishing electronic expansion valve is fully opened; and if the replenished gas of the two-stage compressor does not entrain liquid, the current opening degree of the gas-replenishing electronic expansion valve is kept unchanged or increased.

In some embodiments, the operation that the current opening degree of the gas-replenishing electronic expansion valve is kept unchanged or increased includes: when it is determined that the replenished gas of the two-stage compressor does not entrain liquid, if the operations of reducing the current opening degree of the gas-replenishing electronic expansion valve and keeping the current opening degree of the gas-replenishing electronic expansion valve are executed respectively after it was judged previously twice whether the gas-replenishing superheat degree is greater than the preset opening degrees, the operation of increasing the current opening degree of the gas-replenishing electronic expansion valve is executed, and otherwise, the operation of keeping the current opening degree of the gas-replenishing electronic expansion valve is executed.

According to a second aspect of the embodiment of the present disclosure, a gas-replenishing and enthalpy-increasing control device for a two-stage compressor is also provided. The gas-replenishing and enthalpy-increasing control device includes: a gas-replenishing electronic expansion valve, disposed between a medium-pressure liquid storage tank and a two-stage compressor; and a controller, connected to the gas-replenishing electronic expansion valve, and configured to gradually increase an opening degree of the gas-replenishing electronic expansion valve in a time sequence when the gas-replenishing electronic expansion valve needs to be opened, acquire a gas-replenishing superheat degree of the two-stage compressor after the gas-replenishing electronic expansion valve is opened, and adjust the opening degree of the gas-replenishing electronic expansion valve based on the gas-replenishing superheat degree of the two-stage compressor.

In some embodiments, the gas-replenishing and enthalpy-increasing control device further includes: a detection apparatus, connected to the controller, and configured to collect a gas-replenishing temperature and a gas-replenishing pressure of the two-stage compressor. The controller includes: a reading apparatus, connected to the detection apparatus, and configured to read a saturation temperature corresponding to the gas-replenishing pressure; and a calculator, connected to the detection apparatus and the reading apparatus, and configured to calculate a difference between the gas-replenishing temperature and the saturation temperature, so as to obtain the gas-replenishing superheat degree.

In some embodiments, the detection apparatus further includes: a pressure sensor, disposed at a gas-replenishing port of the two-stage compressor, and configured to collect the gas-replenishing pressure; and a temperature-sensing package, disposed at the gas-replenishing port of the two-stage compressor, and configured to collect the gas-replenishing temperature.

In some embodiments, the gas-replenishing and enthalpy-increasing control device further includes: a four-way valve, a first end being connected to the two-stage compressor; a gas-liquid separator, a first end being connected to a second end of the four-way valve, and a second end being connected to the two-stage compressor; an outdoor heat exchanger, a first end being connected to a third end of the four-way valve; and an indoor heat exchanger, a first end being connected to a fourth end of the four-way valve, and a second end being connected to the medium-pressure liquid storage tank.

In some embodiments, the gas-replenishing and enthalpy-increasing control device further includes: an indoor electronic expansion valve, disposed between the indoor heat exchanger and the medium-pressure liquid storage tank; and an outdoor electronic expansion valve, disposed between the outdoor heat exchanger and the medium-pressure liquid storage tank.

According to a third aspect of the embodiment of the present disclosure, a gas-replenishing and enthalpy-increasing control apparatus for a two-stage compressor is provided. The gas-replenishing and enthalpy-increasing control apparatus includes: a control unit, configured to allow, when a gas-replenishing electronic expansion valve needs to be opened, a controller to gradually increase an opening degree of the gas-replenishing electronic expansion valve in a time sequence; an acquisition unit, configured to acquire, after the gas-replenishing electronic expansion valve is opened, a detected gas-replenishing superheat degree of a two-stage compressor; and an adjustment unit, configured to adjust, based on the gas-replenishing superheat degree of the two-stage compressor, the opening degree of the gas-replenishing electronic expansion valve, wherein the gas-replenishing electronic expansion valve is disposed between a medium-pressure liquid storage tank and the two-stage compressor, and when the opening degree of the gas-replenishing electronic expansion valve is not zero, a gaseous refrigerant in the medium-pressure liquid storage tank replenishes gas and increases enthalpy for the two-stage compressor.

In some embodiments, the control unit includes: a first control module, configured to allow, after the two-stage compressor is opened and operates for a first preset time period, the controller to control the opening degree of the gas-replenishing electronic expansion valve to be a first preset opening degree; a second control module, configured to increase, when the opening degree of the gas-replenishing electronic expansion valve is the first preset opening degree, the opening degree of the gas-replenishing electronic expansion valve to a second preset opening degree after the gas-replenishing expansion valve operates for a second preset time period; and a third control module, configured to fully open, when the opening degree of the gas-replenishing electronic expansion valve is a second preset opening degree, the gas-replenishing electronic expansion valve after the gas-replenishing expansion valve operates for a third preset time period.

In some embodiments, the acquisition unit includes: a collection module, configured to collect a gas-replenishing temperature and a gas-replenishing pressure of the two-stage compressor; an acquisition module, configured to acquire a saturation temperature corresponding to the gas-replenishing pressure; and a calculation module, configured to take a difference between the gas-replenishing temperature and the saturation temperature as the gas-replenishing superheat degree of the two-stage compressor.

In some embodiments, the adjustment unit includes: a judgment module, configured to judge whether the gas-replenishing superheat degree of the two-stage compressor is greater than a preset superheat degree at predetermined intervals; a first determination module, configured to determine that, if the gas-replenishing superheat degree of the two-stage compressor is greater than the preset superheat degree, the replenished gas of the two-stage compressor entrains liquid; a second determination module, configured to determine that, if the gas-replenishing superheat degree of the two-stage compressor is not greater than the preset superheat degree, the replenished gas of the two-stage compressor does not entrain liquid; and an adjustment module, configured to adjust the opening degree of the gas-replenishing electronic expansion valve according to the situation that the replenished gas of the two-stage compressor entrains liquid.

BRIEF DESCRIPTION OF THE DRAWINGS

The drawings described herein are used to provide a further understanding of the present disclosure, and constitute a part of the present application. The exemplary embodiments of the present disclosure and descriptions thereof are used to explain the present disclosure, and do not constitute limitations to the present disclosure. In the drawing.

DETAILED DESCRIPTION OF THE EMBODIMENTS

In order to make those skilled in the art better understand the solution of the present disclosure, the technical solution in the embodiments of the present disclosure will be clearly and completely described hereinbelow with reference to the drawings in the embodiments of the present disclosure. Obviously, the described embodiments are only a part of the embodiments of the present disclosure, not all of the embodiments. On the basis of the embodiments of the present disclosure, all other embodiments obtained on the premise of no creative work of those of ordinary skill in the art shall fall within the scope of protection of the present disclosure.

It should be noted that the specification and claims of the present disclosure and terms "first", "second" and the like in the drawings are intended to distinguish similar objects, and do not need to describe a specific sequence or a precedence order. It should be understood that objects used in such a way may be exchanged under appropriate conditions, in order that the embodiments of the present disclosure described here can be implemented in a sequence except sequences graphically shown or described here. In addition, terms "include" and "have" and any inflexions thereof are intended to cover non-exclusive inclusions. For example, processes, methods, systems, products or devices containing a series of steps or units do not need to clearly show those steps or units, and may include other inherent steps or units of these processes, methods, products or devices, which are not clearly shown.

Figure 1:
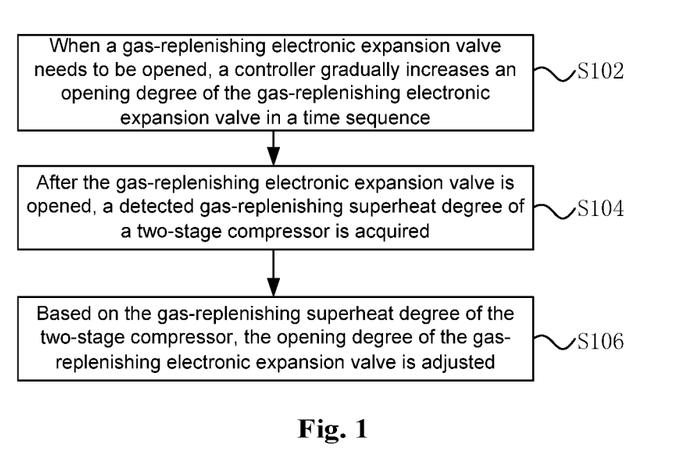
FIG. 1 is a flowchart of a gas-replenishing and enthalpy-increasing control method for a two-stage compressor according to an embodiment of the present disclosure.

According to the embodiment of the present disclosure, a gas-replenishing and enthalpy-increasing control method for a two-stage compressor is provided. FIG. 1 is a flowchart of a gas-replenishing and enthalpy-increasing control method for a two-stage compressor according to an embodiment of the present disclosure. As shown in FIG. 1, the gas-replenishing and enthalpy-increasing control method includes the steps S102 to S106 as follows.

At S102, when a gas-replenishing electronic expansion valve needs to be opened, a controller gradually increases an opening degree of the gas-replenishing electronic expansion valve in a time sequence.

At S104, after the gas-replenishing electronic expansion valve is opened, a detected gas-replenishing superheat degree of a two-stage compressor is acquired.

Specifically, the gas-replenishing superheat degree of the two-stage compressor may be detected by a pressure sensor and a temperature-sensing package in real time.

At S106, based on the gas-replenishing superheat degree of the two-stage compressor, the opening degree of the gas-replenishing electronic expansion valve is adjusted, wherein the gas-replenishing electronic expansion valve is disposed between a medium-pressure liquid storage tank and the two-stage compressor, and when the opening degree of the gas-replenishing electronic expansion valve is not zero, a gaseous refrigerant in the medium-pressure liquid storage tank replenishes gas and increases enthalpy for the two-stage compressor.

By means of the embodiment of the present disclosure, when a gas-replenishing electronic expansion valve needs to be opened, an opening degree of the gas-replenishing electronic expansion valve is gradually increased to open the gas-replenishing electronic expansion valve; and after the gas-replenishing electronic expansion valve is opened, the opening degree of the gas-replenishing electronic expansion valve is adjusted based on a detected gas-replenishing superheat degree of a two-stage compressor. By means of the above embodiment, the gas-replenishing electronic expansion valve is gradually opened, thereby avoiding the defects of rapid improvement of compressor power caused by sudden increase of a compressor load due to opening to closing of a two-way valve only having a switching function during gas replenishment, and eliminating bad influences on the operating stability and reliability of a compressor caused by a gas-replenishing solenoid valve. Moreover, after the gas-replenishing electronic expansion valve is fully opened, a controller adjusts the opening degree of the gas-replenishing electronic expansion valve based on the gas-replenishing superheat degree. In the above embodiment, the gas-replenishing and enthalpy-increasing amount of the two-stage compressor may be accurately controlled by controlling the opening degree of the gas-replenishing electronic expansion valve, thereby solving the problem in the related art of unsatisfying operating stability of a compressor caused by the fact that the gas-replenishing and enthalpy-increasing amount of the two-stage compressor cannot be controlled.

In the above embodiment, when the gas-replenishing electronic expansion valve is opened for the first time, since the opening degree of the expansion valve is gradually increased, the gas-replenishing and enthalpy-increasing amount may be gradually increased, so that the load of the compressor is gradually increased, which also makes the power of the two-stage compressor slowly rise, and improves the starting stability of a compressor system; and after the gas-replenishing electronic expansion valve is opened, the gas-replenishing amount may be adjusted according to different operating conditions, thereby ensuring that the two-stage compressor system may be kept operating efficiently within a wider temperature range, and improving the operating stability of the two-stage compressor.

In some embodiments, the gas-replenishing electronic valve is controlled to open gradually in the time sequence, and after fully opening, the opening degree of the gas-replenishing electronic valve is further controlled based on the gas-replenishing superheat degree acquired in real time, so that a two-stage air-conditioning unit may flexibly adjust, under different operating conditions, the injected amount of the gaseous refrigerant in the medium-pressure liquid storage tank into a two-stage compressor cylinder according to actual requirements, thereby avoiding the defect of inability to control an intermediate gas-replenishing amount when a conventional solenoid valve is used to control the two-stage compressor system, avoiding the phenomena of sporadic gas replenishment, influence on unit performance and poorer comfort caused by the fact that the gas-replenishing valve must be closed when the solenoid valve is used to replenish gas entraining liquid, improving the accuracy of control over the intermediate gas-replenishing amount of the two-stage compressor, and enhancing the operating stability of the two-stage compressor.

In some embodiments, the operation that a controller gradually increases, when a gas-replenishing electronic expansion valve needs to be opened, the opening degree of the gas-replenishing electronic expansion valve in a time sequence includes: after the two-stage compressor is opened and operates for a first preset time period, the controller controls the opening degree of the gas-replenishing electronic expansion valve to be a first preset opening degree; when the opening degree of the gas-replenishing electronic expansion valve is the first preset opening degree, after the gas-replenishing expansion valve operates for a second preset time period, the opening degree of the gas-replenishing electronic expansion valve is increased by a second preset opening degree; and when the opening degree of the gas-replenishing electronic expansion valve is a second preset opening degree, after the gas-replenishing expansion valve operates for a third preset time period, the gas-replenishing electronic expansion valve is fully opened.

In the above embodiment, after the two-stage compressor is opened and operates for a first preset time period, the controller of the two-stage compressor may gradually open the gas-replenishing electronic expansion valve in a time sequence when it is necessary to replenish gas and increase enthalpy, may control the gas-replenishing electronic expansion valve to open for a first preset opening degree, and may control the gas-replenishing electronic expansion valve to open for a second preset opening degree after controlling to stably operate for a second preset time period when the opening degree is the first preset opening degree, wherein the second preset opening degree is greater than the first preset opening degree. When the opening degree is the second preset opening degree, the controller controls to fully open the gas-replenishing electronic expansion valve after controlling to stably operate for a third preset time period. By means of the above embodiment, the gas-replenishing electronic expansion valve is controlled to be gradually opened in a time sequence when needing to be opened, and the opening degree is gradually increased until the gas-replenishing electronic expansion valve is fully opened, thereby reducing the load variation of the two-stage compressor, avoiding the defects of sudden increase in the load and great reduction in reliability caused by sudden injection of a great number of gaseous refrigerants into a corresponding cylinder of the compressor when the gas-replenishing electronic expansion valve is suddenly and fully opened, prolonging the operating life of parts of the two-stage compressor, accurately controlling the gas-replenishing amount of intermediate enthalpy increase of the two-stage compressor, and ensuring continuous and efficient operation of the two-stage compressor.

Specifically, when the unit of the two-stage compressor is started and operates stably for 5 minutes (i.e., the above-mentioned first preset time period), the gas-replenishing electronic expansion valve is controlled to open for the first time, in order to avoid causing an excessive impact on the load of the two-stage compressor. Firstly, step a (i.e., the above-mentioned first preset opening degree) is started and operates stably for time t1 (i.e., the above-mentioned second preset time period), the gas-replenishing electronic expansion valve continues to open, the opening degree is increased to step b (the above-mentioned second preset opening degree), the step b operates stably for t2 time (the above-mentioned third preset time period), step c is started and operates stably for t3 time, and then the gas-replenishing electronic expansion valve is fully opened, thereby achieving segmented opening of the gas-replenishing electronic expansion valve, where the steps a, b, and c are the values of the opening degree of the gas-replenishing electronic expansion valve, a<b<c.

In some embodiments, the operation that the gas-replenishing superheat degree of a detected two-stage compressor is acquired includes: a gas-replenishing temperature and a gas-replenishing pressure of the two-stage compressor are collected; a saturation temperature corresponding to the gas-replenishing pressure is acquired; and a difference between the gas-replenishing temperature and the saturation temperature is taken as the gas-replenishing superheat degree of the two-stage compressor.

In the above embodiment, when the gas-replenishing electronic expansion valve needs to be opened, the controller gradually increases the opening degree of the gas-replenishing electronic expansion valve in a time sequence, collects a gas-replenishing pressure and a gas-replenishing temperature of the two-stage compressor by means of the pressure sensor and the temperature-sensing package after the gas-replenishing electronic expansion valve is opened, acquires a saturation temperature corresponding to the gas-replenishing pressure, obtains the gas-replenishing superheat degree of the two-stage compressor via the difference between the gas-replenishing temperature and the saturation temperature, and then adjusts the opening degree of the gas-replenishing electronic expansion valve based on the gas-replenishing superheat degree. By means of the above embodiment, the gas-replenishing temperature and the gas-replenishing pressure are acquired in real time, operating condition information about the two-stage compressor may be accurately acquired in real time, and an accurate gas-replenishing superheat degree is obtained, thereby achieving the effect of accurately and effectively controlling the gas-replenishing electronic expansion valve.

Specifically, the suction temperature, the exhaust temperature and the gas-replenishing temperature of the two-stage compressor may be obtained through the temperature-sensing package, and the exhaust pressure and the gas-replenishing pressure of the two-stage compressor may be obtained through the pressure sensor. It is set that the exhaust temperature and the gas-replenishing temperature are represented by Td and Tm respectively, the exhaust pressure and the gas-replenishing pressure are represented by Pd and Pm respectively, and the saturation temperatures corresponding to the exhaust pressure and the gas-replenishing pressure are represented by Tdc and Tmc respectively, so, the exhaust superheat degree SHd=Td−Tdc, and the gas-replenishing superheat degree SHm=Tm−Tmc.

In some embodiments, the operation that the opening degree of the gas-replenishing electronic expansion valve is adjusted based on the gas-replenishing superheat degree of the two-stage compressor includes: it is judged whether the gas-replenishing superheat degree of the two-stage compressor is greater than a preset superheat degree at predetermined intervals; if the gas-replenishing superheat degree of the two-stage compressor is greater than the preset superheat degree, it is determined that the replenished gas of the two-stage compressor entrains liquid; if the gas-replenishing superheat degree of the two-stage compressor is not greater than the preset superheat degree, it is determined that the replenished gas of the two-stage compressor does not entrain liquid; and the opening degree of the gas-replenishing electronic expansion valve is adjusted according to the situation that the replenished gas of the two-stage compressor entrains liquid.

In the above embodiment, based on a throttling action of the electronic expansion valve, even when the replenished gas entrains liquid, gas replenishment may be performed by adjusting opening and throttling, and the electronic expansion valve is further controlled based on the gas-replenishing superheat degree. The gas-replenishing and enthalpy-increasing control method may not only guarantee the reliability of the compressor, but also improve the operating performance of the system, particularly improve the low-temperature heating capacity and the high-temperature cooling capacity, and ensure the comfort of a user.

In the above embodiment, when the gas-replenishing electronic expansion valve needs to be opened, the controller gradually increases the opening degree of the gas-replenishing electronic expansion valve in a time sequence, acquires the detected gas-replenishing superheat degree of the two-stage compressor after the gas-replenishing electronic expansion valve is opened, judges whether the gas-replenishing superheat degree of the two-stage compressor is greater than a preset superheat degree at predetermined intervals, determines that, if the gas-replenishing superheat degree of the two-stage compressor is greater than the preset superheat degree, the replenished gas of the two-stage compressor entrains liquid, determines that, if the gas-replenishing superheat degree of the two-stage compressor is not greater than the preset superheat degree, the replenished gas of the two-stage compressor does not entrain liquid, and adjusts the opening degree of the gas-replenishing electronic expansion valve according to the situation that the replenished gas of the two-stage compressor entrains liquid. By means of the above embodiment, the situation of liquid entrainment in the replenished gas is adjusted according to different gas-replenishing superheat degrees, so that the fully-opened gas-replenishing electronic expansion valve may be accurately controlled.

In some embodiments, the operation that the opening degree of the gas-replenishing electronic expansion valve is adjusted according to the situation that the replenished gas of the two-stage compressor entrains liquid includes: if the replenished gas of the two-stage compressor entrains liquid, the current opening degree of the gas-replenishing electronic expansion valve is reduced by a preset opening degree, wherein the preset opening degree is an opening degree preset based on a full opening degree of the gas-replenishing electronic expansion valve, and the full opening degree is an opening degree when the gas-replenishing electronic expansion valve is fully opened; and if the replenished gas of the two-stage compressor does not entrain liquid, the current opening degree of the gas-replenishing electronic expansion valve is kept unchanged or increased.

The operation that the current opening degree of the gas-replenishing electronic expansion valve is kept unchanged or increased in the above embodiment may include: when it is determined that the replenished gas of the two-stage compressor does not entrain liquid, if the operations of reducing the current opening degree of the gas-replenishing electronic expansion valve and keeping the current opening degree of the gas-replenishing electronic expansion valve are executed respectively after it was judged previously twice whether the gas-replenishing superheat degree is greater than the preset opening degrees, the operation of increasing the current opening degree of the gas-replenishing electronic expansion valve is executed, and otherwise, the operation of keeping the current opening degree of the gas-replenishing electronic expansion valve is executed.

The above embodiment will be specifically introduced below in conjunction with FIG. 2.

Figure 2:
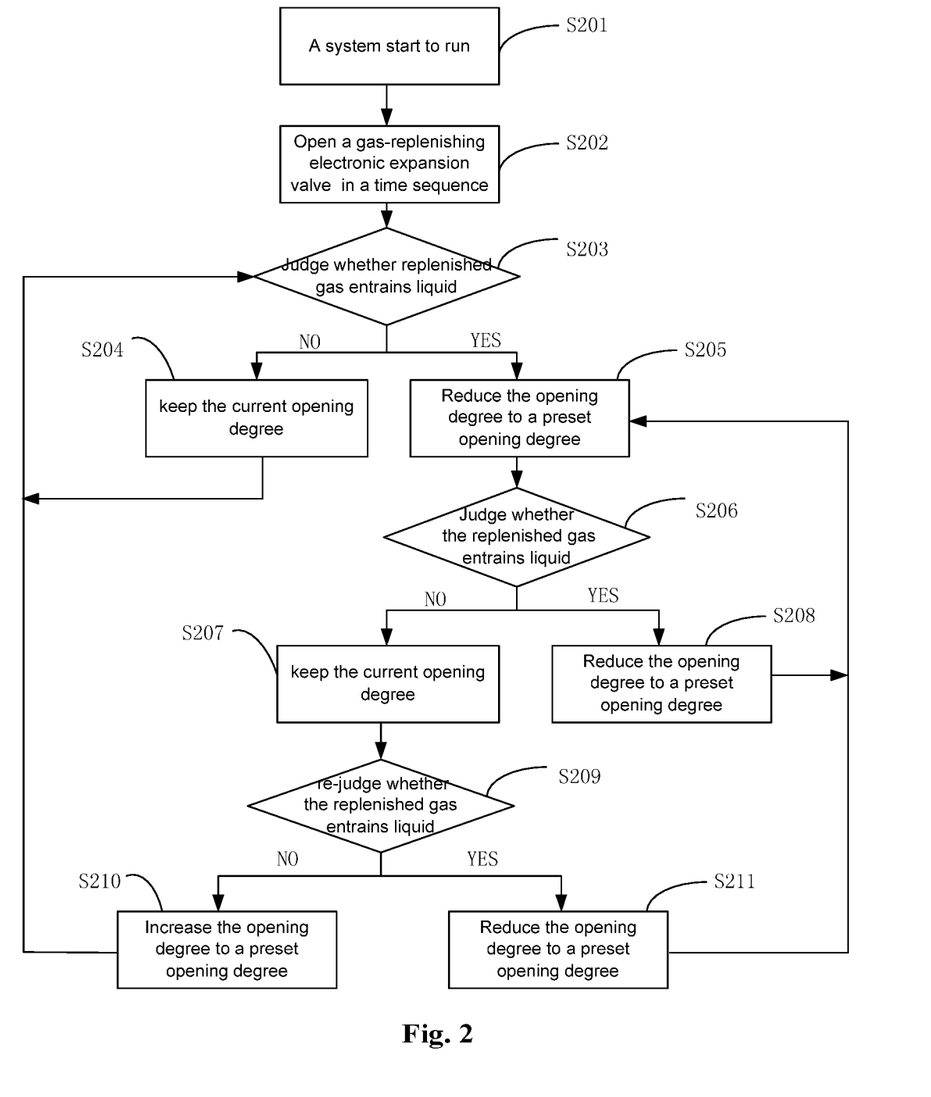
FIG. 2 is a flowchart of an alternative gas-replenishing and enthalpy-increasing control method for a two-stage compressor according to an embodiment of the present disclosure.

Specifically, as shown in FIG. 2, the gas-replenishing and enthalpy-increasing control method for a two-stage compressor may include the steps S201 to S211 as follows.

At S201, a system is run.

Specifically, a two-stage compressor performs a specific gas-replenishing and enthalpy-increasing control operation after the system is run for T1 time (i.e., the above-mentioned first preset time period).

At S202, a gas-replenishing electronic expansion valve is opened in a time sequence.

Specifically, after the two-stage compressor operates for a first preset time period, a controller controls a gas-replenishing electronic expansion valve to open in a time sequence for a first preset opening degree, the two-stage compressor operates for a second preset time period under the first preset opening degree, the opening degree is increased by a second preset opening degree, the two-stage compressor operates for a third preset time period under the first preset opening degree, and so on. The opening degree may be continuously increased, and the two-stage compressor operates for a period of time under the increased opening degree until the gas-replenishing electronic expansion valve is fully opened.

At S203, it is judged whether replenished gas entrains liquid. Specifically, after the gas-replenishing electronic expansion valve is fully opened in a time sequence and operates stably for a period of time (such as T1), a gas-replenishing superheat degree may be used as a standard for judging whether replenished gas entrains liquid, if the gas-replenishing superheat degree of the two-stage compressor is greater than a preset superheat degree, it is determined that the replenished gas of the two-stage compressor entrains liquid, and if the gas-replenishing superheat degree of the two-stage compressor is not greater than the preset superheat degree, it is determined that the replenished gas of the two-stage compressor does not entrain liquid, wherein a specific calculation method for a gas-replenishing superheat degree has been described in the above embodiment, and will not be elaborated herein.

If the judgment result is that the replenished gas does not entrain liquid, S204 is executed, and if the judgment result is that the replenished gas entrains liquid, S205 is executed.

At S204, a current opening degree is kept.

Specifically, when it is determined that the replenished gas does not entrain liquid, that is, a gaseous refrigerant injected under the control of the gas-replenishing electronic expansion valve does not entrain a liquid refrigerant, the gas-replenishing electronic expansion valve is controlled to keep the current opening degree unchanged, and then S203 is re-executed, wherein when the first judgment (i.e., operation executed in S203) is that the replenished gas does not entrain liquid, the current opening degree is kept. Then, detection is performed once every a period of time T1.

At S205, the opening degree is reduced by a preset opening degree.

Specifically, when the first judgment (i.e., operation executed in S203) is that the replenished gas entrains liquid, the opening degree of the gas-replenishing electronic expansion valve is controlled to be reduced by a preset opening degree, the preset opening degree may be one third of a full opening degree, and a second judgment (i.e., operation executed in S206) for liquid entrainment in replenished gas is performed after a period of time T2, wherein the full opening degree is an opening degree corresponding to the fully-opened gas-replenishing electronic expansion valve.

At S206, it is judged whether the replenished gas entrains liquid.

Specifically, after S205 is executed, that is, the opening degree of the gas-replenishing electronic expansion valve is controlled to be reduced by the preset opening degree (such as one third of the full opening degree), when the opening degree is reduced by the preset opening degree (i.e., the reduced opening degree is two thirds of the full opening degree), after operating for a period of time T2, it may be continuously judged whether the replenished gas entrains liquid, and if it is determined that the replenished gas does not entrain liquid, S207 is executed; and if it is determined that the replenished gas entrains liquid, S208 is executed.

At S207, a current opening degree is kept.

Specifically, when the judgment result of the second judgment (i.e., S206) is that the replenished gas does not entrain liquid, the current opening degree is kept, and a third judgment for liquid entrainment in replenished gas is performed after a period of time T2, that is, S209 is continuously executed.

At S208, the opening degree is reduced by a preset opening degree.

Specifically, after the opening degree is reduced by a preset opening degree (such as one third of the full opening degree) in S205, it is determined that the replenished gas entrains liquid, that is, when the second judgment (i.e., operation executed in S206) is that the replenished gas entrains liquid, the opening degree is reduced by a preset opening degree (such as one third of the full opening degree), S206 is re-executed after a period of time T2, and the second judgment (i.e., operation executed in S206) for liquid entrainment in replenished gas is continuously performed. If the opening degree becomes two thirds of the full opening degree after S205 is executed, the opening degree will be reduced to one third of the full opening degree after S208 is executed, and S205 is re-executed. If the opening degree becomes one third of the full opening degree after S205 is executed, the opening degree will be reduced to zero after S208 is executed. In this case, the gas-replenishing electronic expansion valve is completely closed, control is ended, and other steps will be no longer continuously executed.

At S209, it is re-judged whether the replenished gas entrains liquid.

Specifically, it is re-judged whether the replenished gas entrains liquid, that is, the third judgment for liquid entrainment in replenished gas is performed. If the result of the third judgment is that the replenished gas does not entrain liquid, S210 is executed, and then the first judgment for liquid entrainment in replenished gas (i.e., operation executed in S203) is executed. If it is determined that the replenished gas entrains liquid, S211 is executed, and then the second judgment for liquid entrainment in replenished gas (i.e., operation executed in S206) is executed.

At S210, the opening degree is increased by a preset opening degree.

Specifically, if it is determined that the replenished gas does not entrain liquid, the opening degree of the gas-replenishing electronic expansion valve is controlled to be increased by a preset opening degree, the preset opening degree may be one third of the full opening degree, and S203 is re-executed after S210 is executed.

At S211, the opening degree is reduced by a preset opening degree.

Specifically, if it is determined that the replenished gas entrains liquid, the opening degree of the gas-replenishing electronic expansion valve is controlled to be reduced by a preset opening degree (such as one third of the full opening degree), and then S205 is re-executed.

By means of the above embodiment, based on a throttling action of the gas-replenishing electronic expansion valve, a liquid refrigerant may become a gaseous refrigerant or may be in a gas-liquid two-phase state by throttling of the electronic expansion valve. Even when the replenished gas entrains liquid, gas-replenishing amount may be accurately controlled by reducing the opening degree instead of purely closing of the gas-replenishing valve. On the one hand, it may be ensured that the unit performance is not greatly affected during reduction of the gas-replenishing amount, and the unit performance, particularly the comfort of low-temperature heating and high-temperature cooling, is ensured. On the other hand, the stability of the compressor may be ensured by reducing the gas-replenishing amount.

Figure 3:
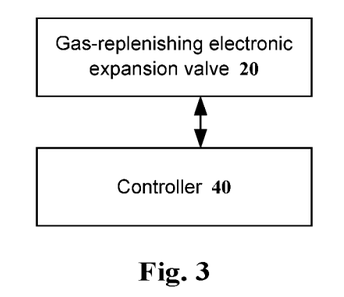
FIG. 3 is a schematic diagram of a gas-replenishing and enthalpy-increasing control device for a two-stage compressor according to an embodiment of the present disclosure.

According to the embodiment of the present disclosure, a gas-replenishing and enthalpy-increasing control device for a two-stage compressor is also provided. As shown in FIG. 3, the gas-replenishing and enthalpy-increasing control device includes a gas-replenishing electronic expansion valve 20 and a controller 40.

The gas-replenishing electronic expansion valve 20 is disposed between a medium-pressure liquid storage tank and a two-stage compressor; and the controller 40 is connected to the gas-replenishing electronic expansion valve, and configured to gradually increase an opening degree of the gas-replenishing electronic expansion valve in a time sequence when the gas-replenishing electronic expansion valve needs to be opened, acquire a gas-replenishing superheat degree of the two-stage compressor after the gas-replenishing electronic expansion valve is opened, and adjust the opening degree of the gas-replenishing electronic expansion valve based on the gas-replenishing superheat degree of the two-stage compressor.

By means of the embodiment of the present disclosure, when a gas-replenishing electronic expansion valve needs to be opened, an opening degree of the gas-replenishing electronic expansion valve is gradually increased to open the gas-replenishing electronic expansion valve; and after the gas-replenishing electronic expansion valve is opened, the opening degree of the gas-replenishing electronic expansion valve is adjusted based on a detected gas-replenishing superheat degree of a two-stage compressor. By means of the above embodiment, the gas-replenishing electronic expansion valve is gradually opened, thereby avoiding the defects of rapid improvement of compressor power caused by sudden increase of a compressor load due to opening to closing of a two-way valve only having a switching function during gas replenishment, and eliminating bad influences on the operating stability and reliability of a compressor caused by a gas-replenishing solenoid valve. Moreover, after the gas-replenishing electronic expansion valve is fully opened, a controller adjusts the opening degree of the gas-replenishing electronic expansion valve based on the gas-replenishing superheat degree. In the above embodiment, the gas-replenishing and enthalpy-increasing amount of the two-stage compressor may be accurately controlled by controlling the opening degree of the gas-replenishing electronic expansion valve, thereby solving the problem in the related art of unsatisfying operating stability of a compressor caused by the fact that the gas-replenishing and enthalpy-increasing amount of the two-stage compressor cannot be controlled.

In some embodiments, the gas-replenishing and enthalpy-increasing control device further includes: a detection apparatus, connected to the controller, and configured to collect a gas-replenishing temperature and a gas-replenishing pressure of the two-stage compressor. The controller includes: a reading apparatus, connected to the detection apparatus, and configured to read a saturation temperature corresponding to the gas-replenishing pressure; and a calculator, connected to the detection apparatus and the reading apparatus, and configured to calculate a difference between the gas-replenishing temperature and the saturation temperature, so as to obtain the gas-replenishing superheat degree.

In some embodiments, the detection apparatus further includes: a pressure sensor, disposed at a gas-replenishing port of the two-stage compressor, and configured to collect the gas-replenishing pressure; and a temperature-sensing package, disposed at the gas-replenishing port of the two-stage compressor, and configured to collect the gas-replenishing temperature.

In some embodiments, the gas-replenishing and enthalpy-increasing control device further includes: a four-way valve, a first end being connected to the two-stage compressor; a gas-liquid separator, a first end being connected to a second end of the four-way valve, and a second end being connected to the two-stage compressor; an outdoor heat exchanger, a first end being connected to a third end of the four-way valve; and an indoor heat exchanger, a first end being connected to a fourth end of the four-way valve, and a second end being connected to the medium-pressure liquid storage tank.

In some embodiments, the gas-replenishing and enthalpy-increasing control device further includes: an indoor electronic expansion valve, disposed between the indoor heat exchanger and the medium-pressure liquid storage tank; and an outdoor electronic expansion valve, disposed between the outdoor heat exchanger and the medium-pressure liquid storage tank.

The gas-replenishing and enthalpy-increasing control device will be described in detail below in conjunction with FIG. 4.

Figure 4:
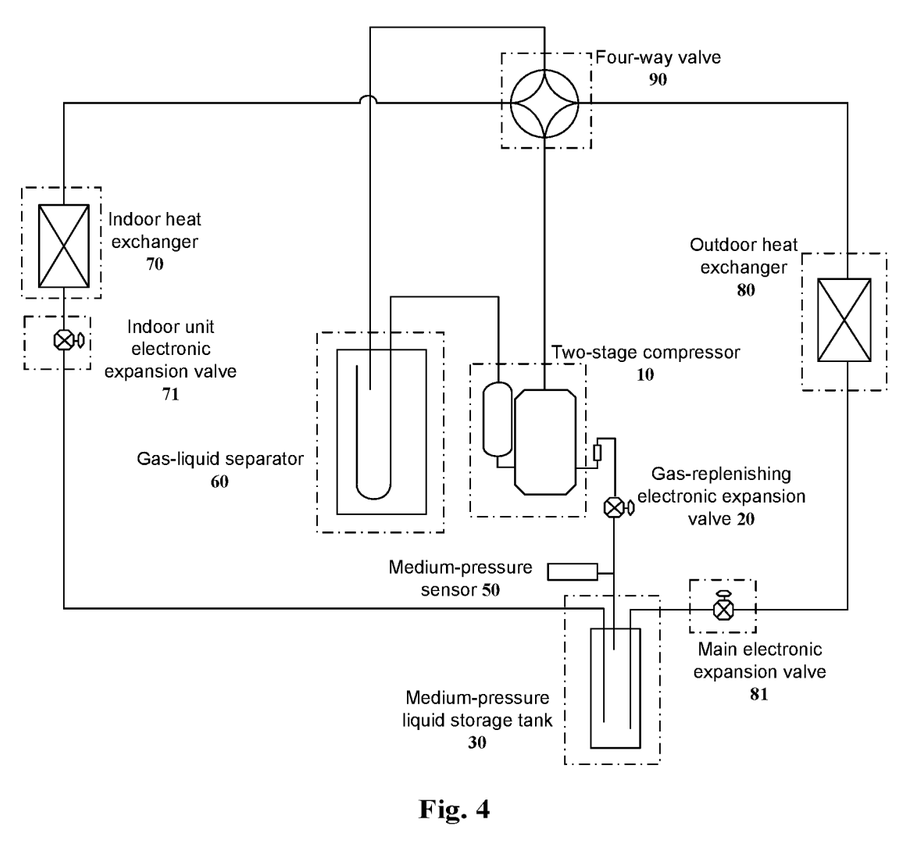
FIG. 4 is a schematic diagram of an alternative gas-replenishing and enthalpy-increasing control device for a two-stage compressor according to an embodiment of the present disclosure.

As shown in FIG. 4, the gas-replenishing and enthalpy-increasing control device may include: a gas-replenishing electronic expansion valve 20, a medium-pressure liquid storage tank 30, a controller, a medium-pressure sensor 50, a gas-liquid separator 60, an indoor heat exchanger 70, an indoor unit electronic expansion valve 71, an outdoor heat exchanger 80, a main electronic expansion valve 81 and a four-way valve 90, wherein the controller is not shown in FIG. 4, FIG. 4 only shows a two-stage compressor 10, and the two-stage compressor 10 may include the controller.

Specifically, the medium-pressure sensor 50 is a pressure sensor disposed at a gas-replenishing port of a two-stage air-conditioning system, and may detect a gas-replenishing pressure. The gas-replenishing electronic expansion valve 20 may control injection of a gaseous refrigerant in the medium-pressure liquid storage tank 30 (also called a flash tank) into a cylinder (which may be a high-pressure cylinder) corresponding to the two-stage compressor based on a gas-replenishing superheat degree, the gas-liquid separator 60 may perform gas-liquid separation on the gaseous refrigerant discharged from the two-stage compressor when the four-way valve 90 is conducted, the four-way valve 90 may control the conduction state of the indoor heat exchanger 70, the outdoor heat exchanger 80 and the two-stage compressor 10, the indoor unit electronic expansion valve 71 may control the conduction state of the indoor heat exchanger 70 and the medium-pressure liquid storage tank 30, and similarly, the main electronic expansion valve 81 may control the connected state of the outdoor heat exchanger 80 and the medium-pressure liquid storage tank 30.

By means of the above embodiment, based on a throttling action of the gas-replenishing electronic expansion valve, a liquid refrigerant may become a gaseous refrigerant or may be in a gas-liquid two-phase state by throttling of the electronic expansion valve. Even when the replenished gas entrains liquid, gas-replenishing amount may be accurately controlled by reducing the opening degree instead of purely closing of the gas-replenishing valve. On the one hand, it may be ensured that the unit performance is not greatly affected during reduction of the gas-replenishing amount, and the unit performance, particularly the comfort of low-temperature heating and high-temperature cooling, is ensured. On the other hand, the stability of the compressor may be ensured by reducing the gas-replenishing amount.

Figure 5:
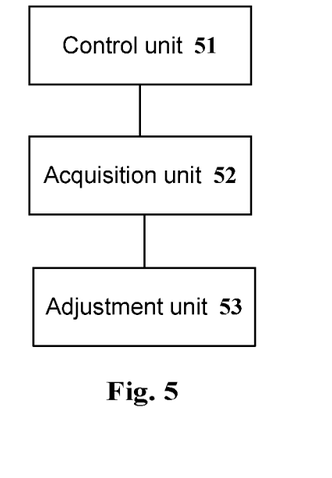
FIG. 5 is a schematic diagram of a gas-replenishing and enthalpy-increasing control apparatus for a two-stage compressor according to an embodiment of the present disclosure.

According to the embodiment of the present disclosure, a gas-replenishing and enthalpy-increasing control apparatus for a two-stage compressor is also provided. As shown in FIG. 5, the gas-replenishing and enthalpy-increasing control device includes a control unit 51, an acquisition unit 52 and an adjustment unit 53.

The control unit 51 is configured to allow, when a gas-replenishing electronic expansion valve needs to be opened, a controller to gradually increase an opening degree of the gas-replenishing electronic expansion valve in a time sequence; the acquisition unit 52 is configured to acquire, after the gas-replenishing electronic expansion valve is opened, a detected gas-replenishing superheat degree of a two-stage compressor; and the adjustment unit 53 is configured to adjust, based on the gas-replenishing superheat degree of the two-stage compressor, the opening degree of the gas-replenishing electronic expansion valve, wherein the gas-replenishing electronic expansion valve is disposed between a medium-pressure liquid storage tank and the two-stage compressor, and when the opening degree of the gas-replenishing electronic expansion valve is not zero, a gaseous refrigerant in the medium-pressure liquid storage tank replenishes gas and increases enthalpy for the two-stage compressor.

By means of the embodiment of the present disclosure, when a gas-replenishing electronic expansion valve needs to be opened, an opening degree of the gas-replenishing electronic expansion valve is gradually increased to open the gas-replenishing electronic expansion valve; and after the gas-replenishing electronic expansion valve is opened, the opening degree of the gas-replenishing electronic expansion valve is adjusted based on a detected gas-replenishing superheat degree of a two-stage compressor. By means of the above embodiment, the gas-replenishing electronic expansion valve is gradually opened, thereby avoiding the defects of rapid improvement of compressor power caused by sudden increase of a compressor load due to opening to closing of a two-way valve only having a switching function during gas replenishment, and eliminating bad influences on the operating stability and reliability of a compressor caused by a gas-replenishing solenoid valve. Moreover, after the gas-replenishing electronic expansion valve is fully opened, a controller adjusts the opening degree of the gas-replenishing electronic expansion valve based on the gas-replenishing superheat degree. In the above embodiment, the gas-replenishing and enthalpy-increasing amount of the two-stage compressor may be accurately controlled by controlling the opening degree of the gas-replenishing electronic expansion valve, thereby solving the problem in the related art of unsatisfying operating stability of a compressor caused by the fact that the gas-replenishing and enthalpy-increasing amount of the two-stage compressor cannot be controlled.

In some embodiments, the control unit includes: a first control module, configured to control, after the two-stage compressor is opened and operates for a first preset time period, the opening degree of the gas-replenishing electronic expansion valve to be a first preset opening degree; a second control module, configured to increase, when the opening degree of the gas-replenishing electronic expansion valve is the first preset opening degree and the gas-replenishing expansion valve have operated for a second preset time period, the opening degree of the gas-replenishing electronic expansion valve to a second preset opening degree; and a third control module, configured to fully open, when the opening degree of the gas-replenishing electronic expansion valve is a second preset opening degree, the gas-replenishing electronic expansion valve after the gas-replenishing expansion valve operates for a third preset time period.

In the above embodiment, after the two-stage compressor is opened and operates for a first preset time period, the controller of the two-stage compressor may gradually open the gas-replenishing electronic expansion valve in a time sequence when it is necessary to replenish gas and increase enthalpy, may control the gas-replenishing electronic expansion valve to open for a first preset opening degree, and may control the gas-replenishing electronic expansion valve to open for a second preset opening degree after controlling to stably operate for a second preset time period when the opening degree is the first preset opening degree, wherein the second preset opening degree is greater than the first preset opening degree. When the opening degree is the second preset opening degree, the controller controls to fully open the gas-replenishing electronic expansion valve after controlling to stably operate for a third preset time period. By means of the above embodiment, the gas-replenishing electronic expansion valve is controlled to be gradually opened in a time sequence when needing to be opened, and the opening degree is gradually increased until the gas-replenishing electronic expansion valve is fully opened, thereby reducing the load variation of the two-stage compressor, avoiding the defects of sudden increase in the load and great reduction in reliability caused by sudden injection of a great number of gaseous refrigerants into a corresponding cylinder of the compressor when the gas-replenishing electronic expansion valve is suddenly and fully opened, prolonging the operating life of parts of the two-stage compressor, accurately controlling the gas-replenishing amount of intermediate enthalpy increase of the two-stage compressor, and ensuring continuous and efficient operation of the two-stage compressor.

In some embodiments, the acquisition unit includes: a collection module, configured to collect a gas-replenishing temperature and a gas-replenishing pressure of the two-stage compressor; an acquisition module, configured to acquire a saturation temperature corresponding to the gas-replenishing pressure; and a calculation module, configured to take a difference between the gas-replenishing temperature and the saturation temperature as the gas-replenishing superheat degree of the two-stage compressor.

In the above embodiment, when the gas-replenishing electronic expansion valve needs to be opened, the controller gradually increases the opening degree of the gas-replenishing electronic expansion valve in a time sequence, collects a gas-replenishing pressure and a gas-replenishing temperature of the two-stage compressor by means of the pressure sensor and the temperature-sensing package after the gas-replenishing electronic expansion valve is opened, acquires a saturation temperature corresponding to the gas-replenishing pressure, obtains the gas-replenishing superheat degree of the two-stage compressor via the difference between the gas-replenishing temperature and the saturation temperature, and then adjusts the opening degree of the gas-replenishing electronic expansion valve based on the gas-replenishing superheat degree. By means of the above embodiment, the gas-replenishing temperature and the gas-replenishing pressure are acquired in real time, operating condition information about the two-stage compressor may be accurately acquired in real time, and an accurate gas-replenishing superheat degree is obtained, thereby achieving the effect of accurately and effectively controlling the gas-replenishing electronic expansion valve.

In some embodiments, the adjustment unit includes: a judgment module, configured to judge whether the gas-replenishing superheat degree of the two-stage compressor is greater than a preset superheat degree at predetermined intervals; a first determination module, configured to determine that, if the gas-replenishing superheat degree of the two-stage compressor is greater than the preset superheat degree, the replenished gas of the two-stage compressor entrains liquid; a second determination module, configured to determine that, if the gas-replenishing superheat degree of the two-stage compressor is not greater than the preset superheat degree, the replenished gas of the two-stage compressor does not entrain liquid; and an adjustment module, configured to adjust the opening degree of the gas-replenishing electronic expansion valve according to the situation that the replenished gas of the two-stage compressor entrains liquid.

In the above embodiment, based on a throttling action of the electronic expansion valve, even when the replenished gas entrains liquid, gas replenishment may be performed by adjusting opening and throttling, and the electronic expansion valve is further controlled based on the gas-replenishing superheat degree. The gas-replenishing and enthalpy-increasing control method may not only guarantee the reliability of the compressor, but also improve the operating performance of the system, particularly improve the low-temperature heating capacity and the high-temperature cooling capacity, and ensure the comfort of a user.

The serial numbers of the embodiments of the present disclosure are only used for descriptions, and do not represent the preference of the embodiments.

In the above embodiments of the present disclosure, descriptions of each embodiment are emphasized respectively, and parts which are not elaborated in detail in a certain embodiment may refer to relevant descriptions of other embodiments.

In some embodiments provided by the present disclosure, it will be appreciated that the disclosed technical contents may be implemented in other modes, wherein the apparatus embodiment described above is only schematic. For example, division of the units may be division of logical functions, and there may be additional division modes during actual implementation. For example, a plurality of units or components may be combined or integrated to another system, or some features may be omitted or may be not executed. In addition, displayed or discussed mutual coupling or direct coupling or communication connection may be performed via some interfaces, and indirect coupling or communication connection between units or modules may be in an electrical form or other forms.

The units illustrated as separate parts may be or may not be physically separated. Parts for unit display may be or may not be physical units. That is, the parts may be located at a place or may be distributed on a plurality of units. The aims of the solutions of the embodiments may be achieved by selecting some or all units according to actual requirements.

In addition, all function units in all embodiments of the present disclosure may be integrated in a processing unit, or each unit may exist separately and physically, or two or more units may be integrated in a unit. The integrated unit may be implemented in a hardware form or may be implemented in a software function unit form.

The above is only preferred implementation modes of the present disclosure. It should be pointed out that those of ordinary skill in the art may also make some improvements and modifications without departing from the principle of the present disclosure. These improvements and modifications should fall within the protection scope of the present disclosure.

What is claimed is:

1. A gas-replenishing and enthalpy-increasing control method for a two-stage compressor, comprising:
when a gas-replenishing electronic expansion valve needs to be opened, gradually increasing, by a controller, an opening degree of the gas-replenishing electronic expansion valve in a time sequence;
after the gas-replenishing electronic expansion valve is opened, acquiring a detected gas-replenishing superheat degree of a two-stage compressor; and
adjusting, based on the gas-replenishing superheat degree of the two-stage compressor, the opening degree of the gas-replenishing electronic expansion valve,
wherein the gas-replenishing electronic expansion valve is disposed between a medium-pressure liquid storage tank and the two-stage compressor, and when the opening degree of the gas-replenishing electronic expansion valve is not zero, a gaseous refrigerant in the medium-pressure liquid storage tank replenishes gas and increases enthalpy for the two-stage compressor;
wherein acquiring the detected gas-replenishing superheat degree of the two-stage compressor comprises:
collecting a gas-replenishing temperature and a gas-replenishing pressure of the two-stage compressor;
acquiring a saturation temperature corresponding to the gas-replenishing pressure; and
taking a difference between the gas-replenishing temperature and the saturation temperature as the gas-replenishing superheat degree of the two-stage compressor;
wherein adjusting, based on the gas-replenishing superheat degree of the two-stage compressor, the opening degree of the gas-replenishing electronic expansion valve comprises:
judging whether the gas-replenishing superheat degree of the two-stage compressor is greater than a preset superheat degree at predetermined intervals;
when the gas-replenishing superheat degree of the two-stage compressor is greater than the preset superheat degree, determining that the replenished gas of the two-stage compressor entrains liquid;
when the gas-replenishing superheat degree of the two-stage compressor is not greater than the preset superheat degree, determining that the replenished gas of the two-stage compressor does not entrain liquid; and
adjusting the opening degree of the gas-replenishing electronic expansion valve according to the situation that the replenished gas of the two-stage compressor entrains liquid;
wherein adjusting the opening degree of the gas-replenishing electronic expansion valve according to the situation that the replenished gas of the two-stage compressor entrains liquid comprises:
when the replenished gas of the two-stage compressor entrains liquid, reducing the current opening degree of the gas-replenishing electronic expansion valve to a preset opening degree, wherein the preset opening degree is an opening degree preset based on a full opening degree of the gas-replenishing electronic expansion valve, and the full opening degree is an opening degree when the gas-replenishing electronic expansion valve is fully opened; and
when the replenished gas of the two-stage compressor does not entrain liquid, keeping the current opening degree of the gas-replenishing electronic expansion valve unchanged or increasing the current opening degree.

2. The method as claimed in claim 1, wherein gradually increasing, by the controller, the opening degree of the gas-replenishing electronic expansion valve in the time sequence when the gas-replenishing electronic expansion valve needs to be opened comprises:
after the two-stage compressor is opened and operates for a first preset time period, controlling, by the controller, the opening degree of the gas-replenishing electronic expansion valve to be a first preset opening degree;
when the opening degree of the gas-replenishing electronic expansion valve is the first preset opening degree, after the gas-replenishing expansion valve operates for a second preset time period, increasing the opening degree of the gas-replenishing electronic expansion valve to a second preset opening degree; and
when the opening degree of the gas-replenishing electronic expansion valve is a second preset opening degree, after the gas-replenishing expansion valve operates for a third preset time period, fully opening the gas-replenishing electronic expansion valve.

3. The method as claimed in claim 1, wherein keeping the current opening degree of the gas-replenishing electronic expansion valve unchanged or increasing the current opening degree comprises:
when determining that the replenished gas of the two-stage compressor does not entrain liquid,
if the operations of reducing the current opening degree of the gas-replenishing electronic expansion valve and keeping the current opening degree of the gas-replenishing electronic expansion valve are executed respectively after whether the gas-replenishing superheat degree is greater than the preset opening degrees has been judged previously twice, executing the operation of increasing the current opening degree of the gas-replenishing electronic expansion valve, and otherwise, executing the operation of keeping the current opening degree of the gas-replenishing electronic expansion valve.

4. A gas-replenishing and enthalpy-increasing control device for a two-stage compressor, comprising:

a gas-replenishing electronic expansion valve, disposed between a medium-pressure liquid storage tank and a two-stage compressor; and a controller, connected to the gas-replenishing electronic expansion valve, and configured to gradually increase an opening degree of the gas-replenishing electronic expansion valve in a time sequence when the gas-replenishing electronic expansion valve needs to be opened, acquire a gas-replenishing superheat degree of the two-stage compressor after the gas-replenishing electronic expansion valve is opened, and adjust the opening degree of the gas-replenishing electronic expansion valve based on the gas-replenishing superheat degree of the two-stage compressor;

a detection apparatus, connected to the controller, and configured to collect a gas-replenishing temperature and a gas-replenishing pressure of the two-stage compressor, wherein the controller comprises:

a reading apparatus, connected to the detection apparatus, and configured to read a saturation temperature corresponding to the gas-replenishing pressure; and a calculator, connected to the detection apparatus and the reading apparatus, and configured to calculate a difference between the gas-replenishing temperature and the saturation temperature, so as to obtain the gas-replenishing superheat degree;

wherein the controller is further configured to:

when the gas-replenishing superheat degree of the two-stage compressor is greater than the preset superheat degree, determine that the replenished gas of the two-stage compressor entrains liquid, and reduce the current opening degree of the gas-replenishing electronic expansion valve to a preset opening degree, wherein the preset opening degree is an opening degree preset based on a full opening degree of the gas-replenishing electronic expansion valve, and the full opening degree is an opening degree when the gas-replenishing electronic expansion valve is fully opened when the gas-replenishing superheat degree of the two-stage compressor is not greater than the preset superheat degree, determine that the replenished gas of the two-stage compressor does not entrain liquid, and keep the current opening degree of the gas-replenishing electronic expansion valve unchanged or increasing the current opening degree.

5. The device as claimed in claim 4, wherein the detection apparatus further comprises:

a pressure sensor, disposed at a gas-replenishing port of the two-stage compressor, and configured to collect the gas-replenishing pressure; and a temperature-sensing package, disposed at the gas-replenishing port of the two-stage compressor, and configured to collect the gas-replenishing temperature.

6. The device as claimed in claim 4, further comprising:

a four-way valve, a first end being connected to the two-stage compressor;

a gas-liquid separator, a first end being connected to a second end of the four-way valve, and a second end being connected to the two-stage compressor;

an outdoor heat exchanger, a first end being connected to a third end of the four-way valve; and an indoor heat exchanger, a first end being connected to a fourth end of the four-way valve, and a second end being connected to the medium-pressure liquid storage tank.

7. The device as claimed in claim 6, further comprising:

an indoor electronic expansion valve, disposed between the indoor heat exchanger and the medium-pressure liquid storage tank; and an outdoor electronic expansion valve, disposed between the outdoor heat exchanger and the medium-pressure liquid storage tank.

8. A gas-replenishing and enthalpy-increasing control apparatus for a two-stage compressor, comprising:

a control unit, configured to allow, when a gas-replenishing electronic expansion valve needs to be opened, a controller to gradually increase an opening degree of the gas-replenishing electronic expansion valve in a time sequence;

an acquisition unit, configured to acquire, after the gas-replenishing electronic expansion valve is opened, a detected gas-replenishing superheat degree of a two-stage compressor; and an adjustment unit, configured to adjust, based on the gas-replenishing superheat degree of the two-stage compressor, the opening degree of the gas-replenishing electronic expansion valve, wherein the gas-replenishing electronic expansion valve is disposed between a medium-pressure liquid storage tank and the two-stage compressor, and when the opening degree of the gas-replenishing electronic expansion valve is not zero, a gaseous refrigerant in the medium-pressure liquid storage tank replenishes gas and increases enthalpy for the two-stage compressor;

wherein the acquisition unit comprises:

a collection module, configured to collect a gas-replenishing temperature and a gas-replenishing pressure of the two-stage compressor;

an acquisition module, configured to acquire a saturation temperature corresponding to the gas-replenishing pressure; and a calculation module, configured to take a difference between the gas-replenishing temperature and the saturation temperature as the gas-replenishing superheat degree of the two-stage compressor;

wherein the adjustment unit comprises:

a judgment module, configured to judge whether the gas-replenishing superheat degree of the two-stage compressor is greater than a preset superheat degree at predetermined intervals;

a first determination module, configured to determine that, if the gas-replenishing superheat degree of the two-stage compressor is greater than the preset superheat degree, the replenished gas of the two-stage compressor entrains liquid;

a second determination module, configured to determine that, if the gas-replenishing superheat degree of the two-stage compressor is not greater than the preset superheat degree, the replenished gas of the two-stage compressor does not entrain liquid; and an adjustment module, configured to adjust the opening degree of the gas-replenishing electronic expansion valve according to the situation that the replenished gas of the two-stage compressor entrains liquid;

wherein the adjustment unit is further configured to:

when the replenished gas of the two-stage compressor entrains liquid, reduce the current opening degree of the gas-replenishing electronic expansion valve to a preset opening degree, wherein the preset opening degree is an opening degree preset based on a full opening degree of the gas-replenishing electronic expansion valve, and the full opening degree is an opening degree when the gas-replenishing electronic expansion valve is fully opened; and when the replenished gas of the two-stage compressor does not entrain liquid, keep the current opening degree of the gas-replenishing electronic expansion valve unchanged or increasing the current opening degree.

9. The apparatus as claimed in claim 8, wherein the control unit comprises:

a first control module, configured to control, after the two-stage compressor is opened and operates for a first preset time period, the opening degree of the gas-replenishing electronic expansion valve to be a first preset opening degree;

a second control module, configured to increase, when the opening degree of the gas-replenishing electronic expansion valve is the first preset opening degree and the gas-replenishing expansion valve have operated for a second preset time period, the opening degree of the gas-replenishing electronic expansion valve to a second preset opening degree; and a third control module, configured to fully open, when the opening degree of the gas-replenishing electronic expansion valve is a second preset opening degree and the gas-replenishing expansion valve have operated for a third preset time period, the gas-replenishing electronic expansion valve.

* * * * *